(12) United States Patent
Schaffter

(10) Patent No.: US 9,682,492 B1
(45) Date of Patent: Jun. 20, 2017

(54) LOCK MITER SET-UP JIG

(71) Applicant: Infinity Cutting Tools, Inc., Oldsmar, FL (US)

(72) Inventor: Alan B. Schaffter, Washington, NC (US)

(73) Assignee: Infinity Cutting Tools, Inc., Oldsmar, FL (US)

( * ) Notice: Subject to any disclaimer, the term of this patent is extended or adjusted under 35 U.S.C. 154(b) by 708 days.

(21) Appl. No.: 14/246,759

(22) Filed: Apr. 7, 2014

Related U.S. Application Data

(60) Provisional application No. 61/809,306, filed on Apr. 6, 2013.

(51) Int. Cl.
*B27G 23/00* (2006.01)
*B23Q 17/22* (2006.01)

(52) U.S. Cl.
CPC ......... *B27G 23/00* (2013.01); *B23Q 17/2233* (2013.01)

(58) Field of Classification Search
CPC  B23Q 17/22; B23Q 17/2225; B23Q 17/2233; B27B 5/04; B27B 33/20; B27G 23/00; B27C 5/10; B27C 5/02; B27C 5/04; B26D 3/02
USPC .......................................................... 33/638
See application file for complete search history.

(56) References Cited

U.S. PATENT DOCUMENTS

| 6,061,921 | A | * | 5/2000 | Adams ...................... B27C 5/04 144/253.1 |
| 7,260,897 | B1 | | 8/2007 | Neff |
| 7,448,419 | B1 | | 11/2008 | Sommerfeld |

OTHER PUBLICATIONS

Infinity Tools, Infinity Cutting Tools—Lock Miter Router Bit Setup Blocks, Nov. 8, 2011, https://www.youtube.com/watch?v=v-_bGkR2SKM.*

* cited by examiner

*Primary Examiner* — Matthew G Katcoff
(74) *Attorney, Agent, or Firm* — Nicholas Pfeifer; Smith & Hopen, P.A.

(57) ABSTRACT

A woodworking jig is used to set cutter height and horizontal fence position when forming lock miter joints with a forty-five degree (45°) lock miter cutter on a router table or shaper. Vertical and horizontal reference lines are formed on the exterior surface of the jig. Setup is accomplished by adjusting the cutter height and fence position until the appropriate reference lines on the jig align with centerlines or centerline-derived lines on the edge of the stock. Using the appropriate reference lines, the jig is used to complete setups for standard lock miter joints with boards of equal thickness, non-standard lock miters joints with boards of different thicknesses, and offset lock miter joints. The jig has no moving parts, requires no calibration or measuring devices, and works with any lock miter router bit and most shaper cutters. The jig locates the geometric center of the router bit profile with precision.

12 Claims, 10 Drawing Sheets

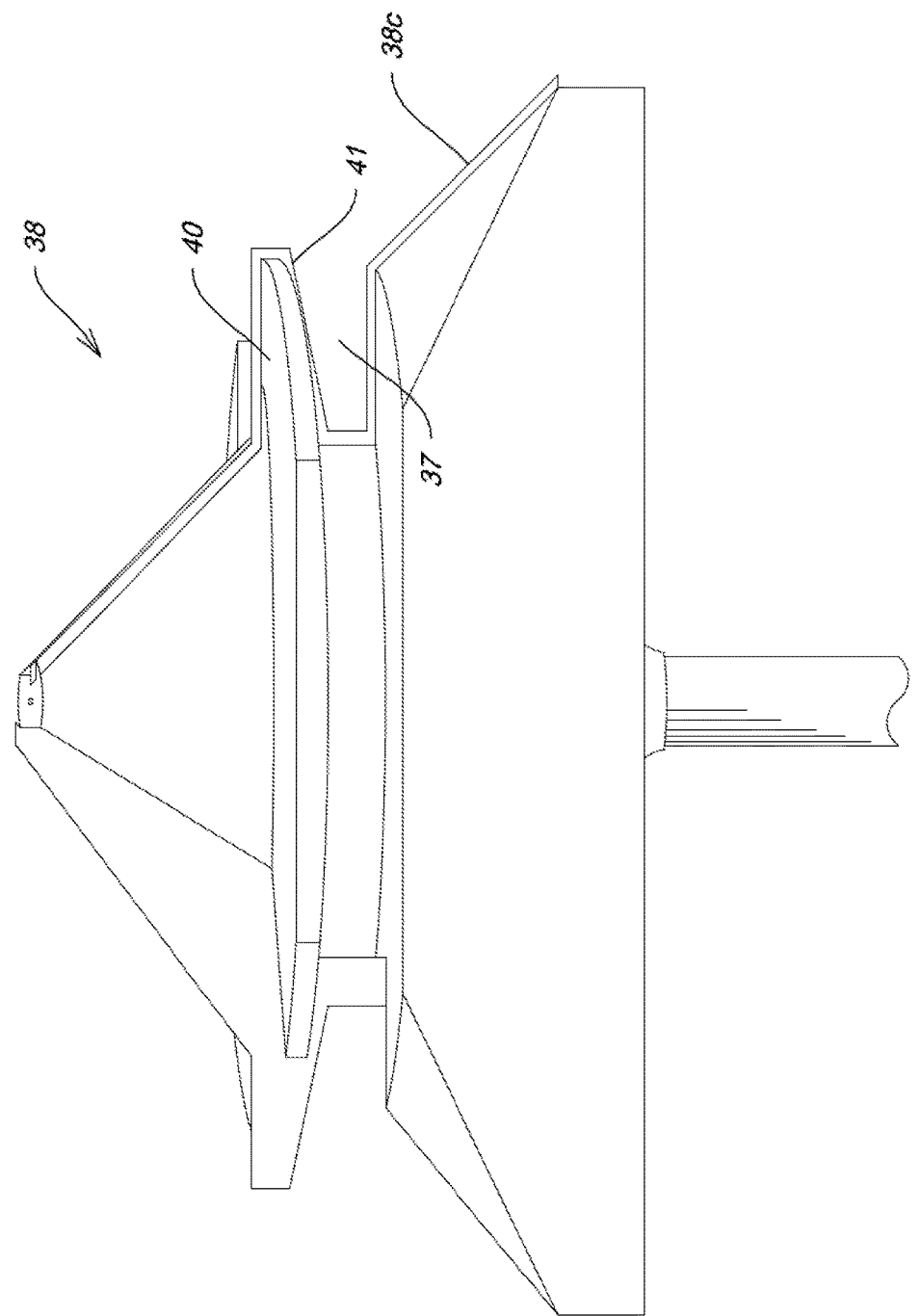

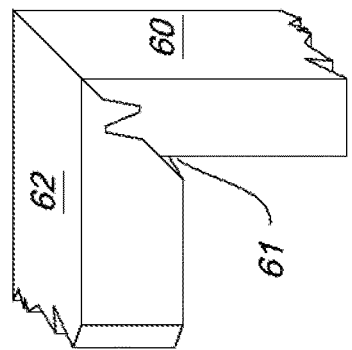
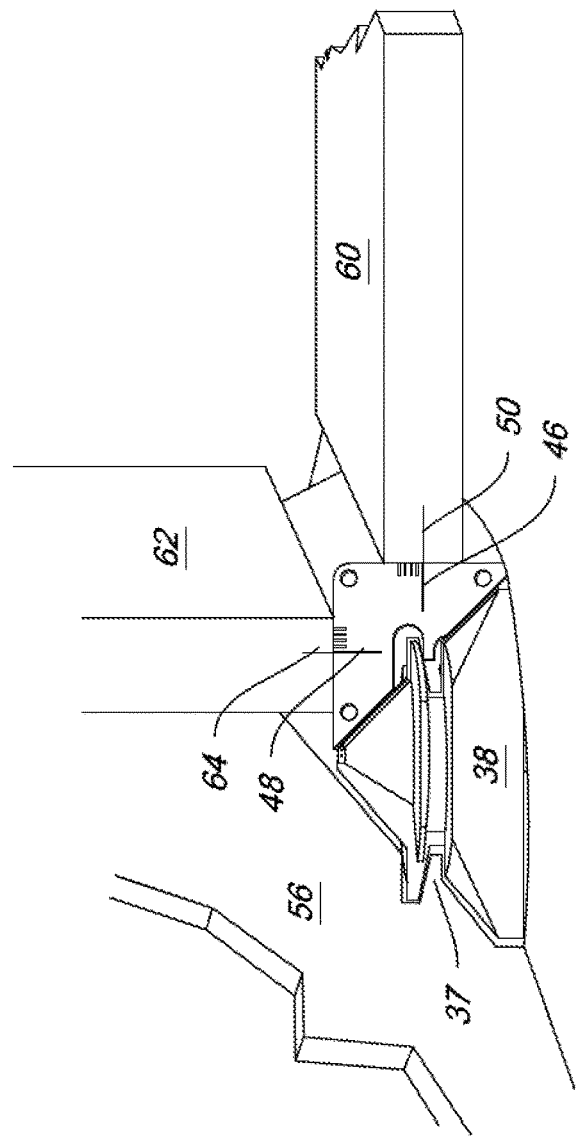

LOCK MITER SET-UP JIG

BACKGROUND OF THE INVENTION

1. Field of the Invention

This invention relates, generally, to the art of wood working. More particularly, it relates to tools for forming corners made of boards that share a common thickness, that have differing thicknesses, or where an offset of the joint line is desired.

2. Description of the Prior Art

A forty five degree (45°) lock miter router bit or shaper cutter, hereinafter also referred to sometimes as the cutter, is used to make forty five degree (45°) beveled cuts in the edges or ends of two boards that when assembled create a ninety degree (90°) joint. Contours in the cutter also create mating male and female profiles in a portion of the adjoining edges. These profiles increase gluing surfaces which results in a joint that is stronger than a straight miter. They also prevent the assembled joint from slipping along the joint line when clamped. The cutter geometry and the procedure of cutting one board in the horizontal position and the other one in the vertical position permit a single cutter to be used. Cutter height and fence position must be set precisely, however. Conventional devices and methods for making both settings are often extremely inadequate, incorrect, or so imprecise that all too often the procedure becomes one of trial and error.

The number and capabilities of prior art devices that can be used for accurate lock miter cutter setups are extremely limited. Most non-patented devices consist of nothing more than profile matching set-up blocks. These blocks are machined with a lock miter cutter after it has been properly set up, often by trial and error. The disadvantages of these blocks are that they can only be used with the specific style and size of lock miter cutter used to create them and only with boards that are exactly the same thickness as the set-up block, usually ¾". U.S. Pat. No. 7,448,419 to Sommerfield discloses multiple router bit set-up blocks and is adjustable but it relies on matching the profile of the cutter from the same manufacturer.

Most prior art devices include standard, adjustable machinery set-up gauges that are used to adjust the bit by comparing predetermined dimensions to a known point on the cutter. They have the same disadvantages as set-up blocks. Most are two-to-one (2:1) measuring systems, proportional dividers or linear proportioners that are used primarily to find the center of the material being cut.

U.S. Pat. No. 7,260,897 discloses a device that assumes a lock miter cutter is always vertically symmetrical or that the length/depth of the matching male/female profiles are identical, or both. Such assumptions are seldom accurate.

The geometric center point of the router bit profile of all lock miter cutters, regardless of size or shape of the profile, is located at the intersection of a line coincident with the forty five degree (45°) cutting edge and the common cutting edge between the male and female profiles. No prior art device harnesses the power of this geometric fact and therefore the known devices are of limited use in making precise setups to cut standard lock miters and are of no use in making non-standard and offset lock miter setups.

Accordingly, there is a need for an improved jig for setting lock miter shaper cutters that requires no measuring devices, table of cutter dimensions, or mathematics, that requires no additional reference objects other than a machine table, fence and boards, is small, light-in-weight, has a simple fixed design with no moving parts, requires no initial nor follow-on calibration or adjustment, is designed specifically for use with lock miter cutters, and which works with almost all brands, styles, and sizes of lock miter cutters, with the possible exception of shaper cutters having cutting edges that are chords, offset from a radius by a significant amount.

There is also a need for an improved jig for setting lock miter shaper cutters that temporarily mounts directly to and is easily attached and removed from the cutter, can be easily positioned correctly, has a reference edge, also referred to as an elongate step, and a geometric center point of the router bit profile, both of which act as stops, and which guarantees precise error-free positioning of the jig.

Moreover, there is a need for a jig that, when correctly positioned on the cutter, has a geometric center point located precisely at the exact geometric center of the cutter profile, has horizontal and vertical reference lines originating at the geometric center point of the router bit profile which allow the user to easily and precisely set cutter height and fence position in relation to the geometric center of the cutter profile by visually aligning the lines, allows the user to easily make precise setups for standard lock miter joints in boards that are the same thickness, allows the user to easily make precise setups for non-standard lock miter joints in boards having different thicknesses, and allows the user to easily make setups for off-set lock miter joints.

However, in view of the art considered as a whole at the time the present invention was made, it was not obvious to those of ordinary skill in the art how the needed structure could be provided.

SUMMARY OF THE INVENTION

The long-standing but heretofore unfulfilled need for an improved jig that facilitates lock miter set ups is now met by a new, useful, and non-obvious invention.

The novel jig facilitates the formation of a miter joint in boards. It includes a flat base having an elevated area and a recessed area. The flat base has four sides. The first side is the top edge and includes ruler measurement lines that depend vertically from the top edge, one of which is called the main vertical measurement line because it is positioned mid-length of the top edge.

The second side is the vertical edge which includes horizontally disposed ruler measurement lines, one of which is called the main horizontal measurement line because it is positioned mid-length of the vertical edge.

The third side is the bottom edge which is parallel to the top edge but which has a shorter extent and which has no ruler measurement lines imprinted thereon.

The fourth side is the oblique edge because it is neither horizontal nor vertical. It extends from the top edge to the bottom edge of the jig and also has no ruler measurement lines. The top and bottom edges lie in a horizontal plane when the jig is in use and the vertical edge lies in a vertical plane when the jig is in use.

The elevated area of the jig has the form of a right triangle, including one right angle where the top edge and the vertical edge of the flat base meet one another and two forty five degree (45°) angles.

The first forty five degree (45°) angle of the elevated area is where the vertical edge meets a first part of an elongate step formed where the recessed area meets the elevated area.

The second forty five degree (45°) angle of the elevated area is where the top edge meets a second part of the elongate step formed where the recessed area meets the elevated area.

The recessed area includes one angle greater than ninety degrees (90°) where the bottom edge meets the oblique edge, one forty five degree (45°) angle where the vertical edge meets the bottom edge, and one angle less than forty five degrees (45°) where the oblique edge meets the top edge.

The elongate step formed where the elevated area and the recessed area meet one another is discontinuous. If it were continuous, it would form the hypotenuse of the right triangle.

The router bit socket has two (2) slots formed in it on opposite sides of the bit. Each slot extends the entire height of the router bit and has a width several times greater than the thickness of the jig. The recessed area of the jig enters into a preselected slot and the elongate step is adapted to abut the router bit at the edge of the slot. The router bit is oriented to rotate about a vertical axis of symmetry relative to a horizontal tabletop that supports the router bit and the jig is positioned in abutting relation to the router bit with the flat base oriented in a vertical plane.

The elongate step is discontinuous a predetermined distance that begins at the geometric center point. The predetermined distance is sized to fit all conventional lock miter router bits.

The elongate step has a first part beginning at a first forty five degree (45°) angle of said two forty five degree (45°) angles. The elongate step has a second part beginning at a second forty five degree (45°) angle of said two forty five degree (45°) angles that is co-linear with the first part and extends toward the geometric center point, terminating at a termination point which is a predetermined distance from the geometric center point.

The recessed area includes a main recessed area and a secondary recessed area. The secondary recessed area creates the discontinuity in the elongate step.

More particularly, the first part of the elongate step extends from the first forty five degree (45°) angle and follows a first path of travel that extends straight to and terminates at the geometric center point. When the jig is in use, the first part of the elongate step abuts the frusto-conical surface of the router bit below the socket formed in the router bit.

The second part of the elongate step extends from the second forty five degree (45°) angle and extends straight to a termination point that is spaced apart from the geometric center point by a predetermined distance. When the jig is in use, the second part of the elongate step abuts the frusto-conical surface of the router bit above the socket formed in the router bit.

To use the jig, the jig is held in a vertical plane and the first and second parts of the elongate step are placed into abutting relation to the frusto-conical surface of the router bit with the geometric center point near the lowermost wall of the socket formed in the router bit. The magnets of the recessed area that enters into the router slot will engage the carbide strip at the edge of the cutter slot. The user then slides the jig up until the geometric center point abuts the top wall of the socket which is also the bottom wall of the router but protuberance. The point of contact between the geometric center point of the jig and that wall of the router bit socket is the geometric center point of the router bit profile. The main vertical reference line of the jig will point straight at that point as will the main horizontal reference line of the jig, i.e., said main reference lines are disposed at a ninety degree (90°) angle with reference to one another and both radiate from said geometric center point of the router bit profile.

A jig protuberance is formed by the second and third paths of travel of said first part of the elongate step and is provided to strengthen the center point tip against damage. The jig protuberance includes a bottom wall formed by the second path of travel.

The novel jig is used with a conventional lock miter router bit having a main body of generally frusto-conical shape. The router bit includes an annular protuberance that extends radially outwardly with respect to the axis of symmetry of the frusto-conical main body. The router bit also includes an annular socket that extends radially inwardly with respect to the axis of symmetry. The secondary recessed area of the jig is adapted to accommodate the router bit annular protuberance when the jig is disposed in abutting relation to the router bit.

The secondary recessed area has a first edge following a first path of travel beginning at the geometric center point and extending horizontally toward the vertical edge of the jig to a second point, a second edge following a second path of travel extending from the second point toward the top edge of the jig in parallel relation to the vertical edge of the jig to a third point, and a third edge following a third path of travel extending horizontally from the third point to the termination point of the second part of the elongate step.

The annular router protuberance has a horizontal top wall, a vertical edge wall, and a diagonal bottom wall.

The annular router socket has a horizontal bottom wall extending toward the router bit vertical axis of symmetry, a vertical wall extending from the radially innermost end of the socket horizontal bottom wall, and a diagonal top wall extending from a top of the socket vertical wall to a bottom of the vertical edge wall of the router protuberance. The socket diagonal top wall and the diagonal bottom wall of the router protuberance are the same wall.

The jig protuberance bottom wall is adapted to overlie the horizontal bottom wall of the router bit socket when the jig is placed into abutting relation to the router. The jig is then slid upwardly until the tip of the jig protuberance abuts the diagonal bottom wall of the router bit protuberance, which bottom wall is also the diagonal top wall of the router bit socket. The geometric center point of the router bit profile is the point where the tip of the jig protuberance abuts the socket diagonal top wall. The exact geometric center point of any lock miter cutter profile, regardless of profile design, is where the tip of the jig protuberance, also known as the geometric center point, meets the socket diagonal wall. Accordingly, when the jig is attached so that both parts of the elongate step abut the forty five degree (45°) cutting edge of the cutter, and the tip of the jig protuberance abuts the diagonal bottom wall of the router bit protuberance, i.e., the diagonal top wall of the router bit socket, the point of contact is the geometric center point of the router bit profile.

A main horizontal reference line extends from the first edge of the secondary recessed area to the vertical edge of the jig in horizontal alignment with the geometric center point. A main vertical reference line extends from the third edge of the secondary recessed area to the top edge of the jig in vertical alignment with the geometric center point. The main horizontal and vertical reference lines are disposed at a right angle to one another.

The jig is magnetically secured to the router bit to facilitate aligning the reference lines with lines that have been scribed on the corner boards.

The primary object of the invention is to advance the art of wood working by providing a jig that facilitates the making of corners.

A closely related object is to provide a jig that facilitates the set-up of a conventional lock miter router bit and fence for boards of common thicknesses as well as boards of differing thicknesses.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 2A is essentially a side elevation view of a conventional lock miter cutter with a slight perspective;

FIG. 6A depicts a setup for lock miter joints in boards of differing thicknesses;

FIG. 6B depicts a lock miter joint in boards having differing thicknesses;

DETAILED DESCRIPTION OF THE PREFERRED EMBODIMENT

Figure 1:
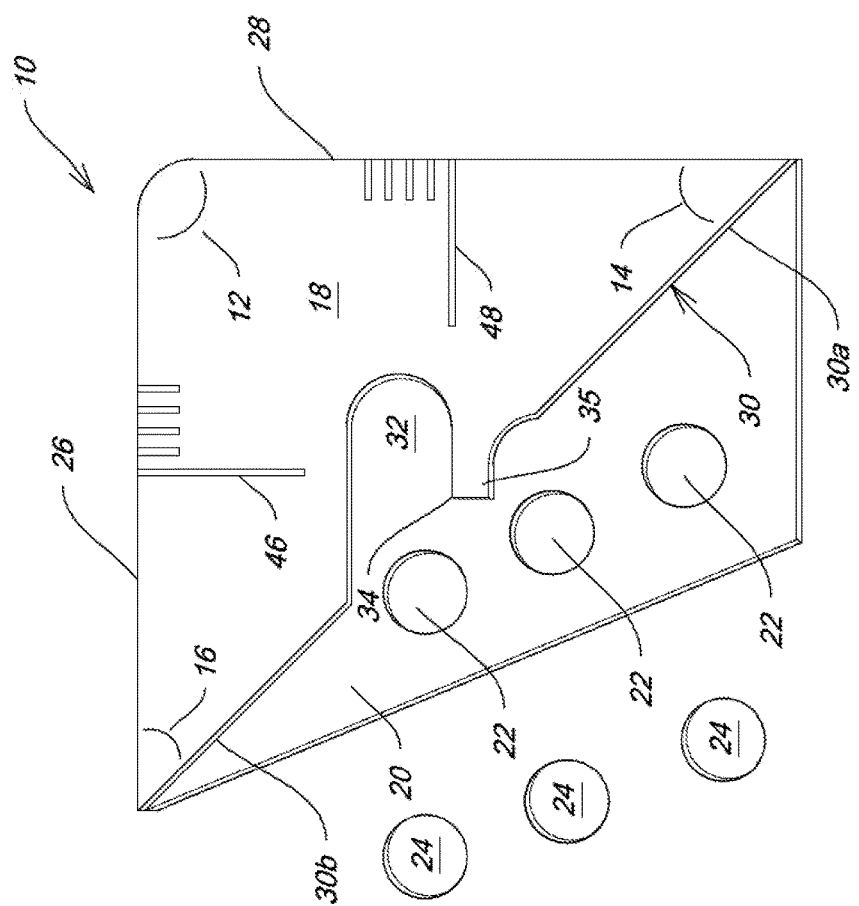
FIG. 1 is essentially a side elevation view of the novel lock miter set-up jig with a slight perspective to indicate jig thickness.

FIG. 1 depicts an illustrative embodiment of the novel structure which is denoted as a whole by the reference numeral 10.

Novel jig 10 can be made of any size and of any durable material. Angle 12 is a ninety degree angle, angle 14 is a forty five degree (45°) angle, and angle 16 is therefore a forty five degree (45°) angle as well.

Jig 10 has a flat elevated surface 18 and a recessed flat surface 20. Flat elevated surface 18 is preferably about 3/16th of an inch in thickness and recessed flat surface 20 is about half that.

A plurality of pockets, collectively denoted 22, are milled in recessed flat surface 20 and each pocket receives a rare earth magnet 24 therewithin. The magnets are preferably press fit within their respective pockets but any suitable connection means is within the scope of this invention.

First side 26 in this preferred embodiment is 1¼" in length and second side 28 has the same length. Third side 30 therefore would be 1.7678 inches (the square root of 3.125) in length if it were continuous. However, said third side is discontinuous as depicted. Recessed area 32 is a clearance recess, also referred to herein as a secondary recessed area. Significantly, point 34 of jig protuberance 35 is the geometric center point of the router bit profile. The vertical edge of jig protuberance 35 could be cut at a forty five degree (45°) angle to align with steps 30a and 30b, disclosed below, but it has increased structural integrity when squared off with a vertical edge as drawn.

Secondary recessed area 32 divides third side 30 into first part 30a and second part 30b. Both of said parts abut a cutter, not depicted in FIG. 1, said cutter being conventional and having a frusto-conical surface that is angled at a forty-five degree (45°) angle relative to its longitudinal axis of symmetry. Due to the difference in elevation between raised surface 18 and recessed surface 20, parts 30a and 30b collectively form a step that is referred to hereinafter as elongate step 30; it serves as a reference edge.

A conventional, prior art cutter 38 of frusto-conical configuration is depicted in side elevation in FIG. 2A. The surface of frusto-conical cutter 38 is angled forty five degrees (45°) relative to the axis of symmetry, i.e., the axis of rotation, of cutter 38 and elongate step 30 abuts said frusto-conical surface 38 when novel jig 10 is in use. Socket 37 is formed in cutter 38 and circumscribes it in a horizontal plane.

Figure 2B:
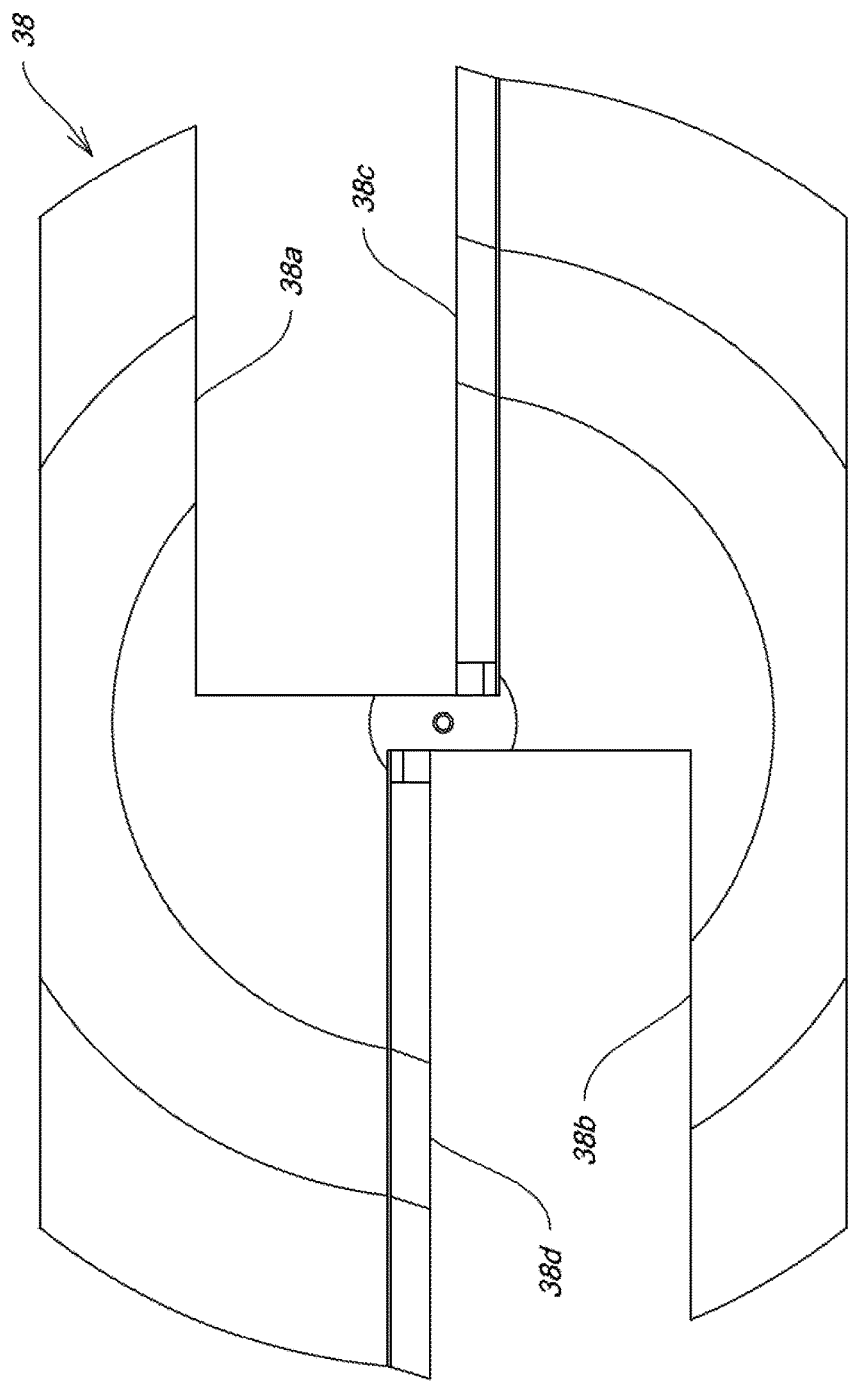
FIG. 2B is a top plan view of the lock miter cutter of FIG. 2A.

FIG. 2B is a top plan view depicting the slots 38a, 38b formed in cutter 38. Each slot 38a, 38b receives a carbide cutting element 38c, 38d, respectively. Recessed surface 20 of jig 10 is received within a preselected one of said slots when jig 10 is in use. Elongate step 30 abuts the surface of cutter 38 when recessed surface 20 is received with a preselected slot 38a or 38b.

Figure 2C:
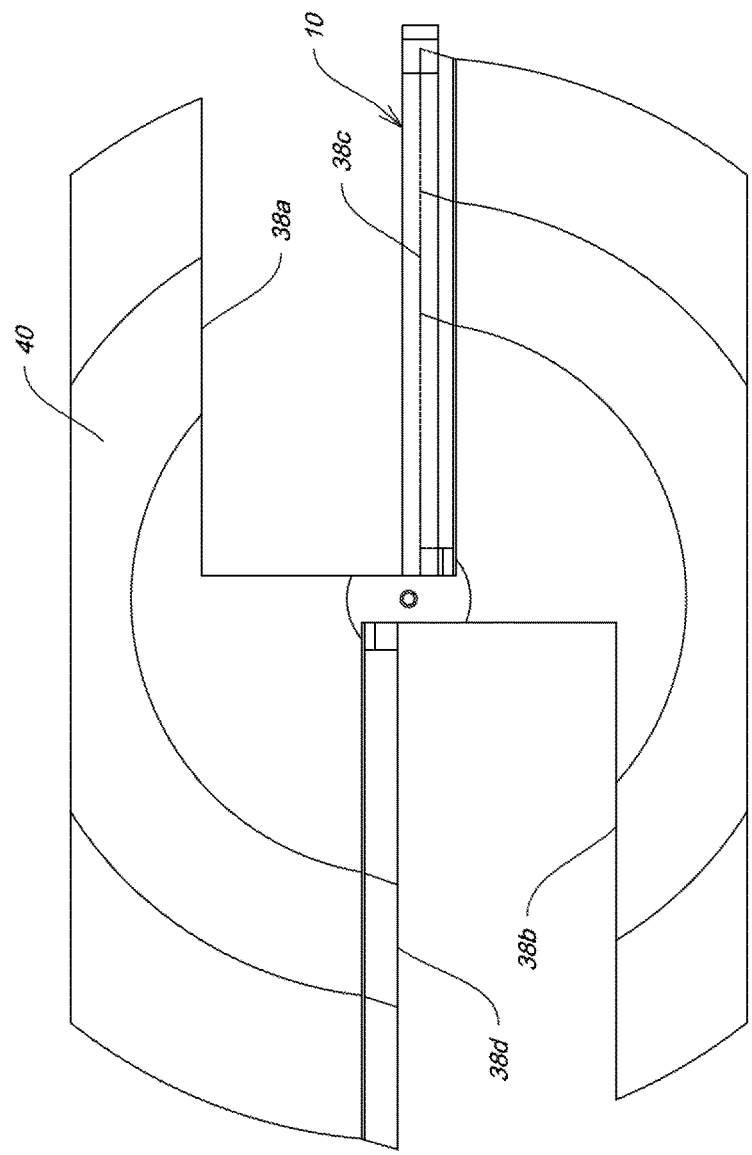
FIG. 2C is a top plan view of the lock miter cutter of FIG. 2A with the novel jig secured by magnets within a slot formed in the cutter.

More particularly, all lock miter router bits, like many router bits, have large axial reliefs (deep slots) formed in the body of the bit. Those slots are denoted 38a, 38b in FIGS. 2B and 2C. Most router bits are made from two materials: 1) A machined steel body 38 and; 2) Silicon carbide cutters 38c, 38d. In FIGS. 2B and 2C, a strip of silicon carbide 38c, 38d has been brazed to one wall of each slots 38a, 38b. Each carbide strip extends slightly above the surface of router bit main body 38 and is ground at an angle and sharpened to a cutting edge.

Each slot 38a, 38b is much wider than jig 10 is thick and deeper than the width of secondary recessed area 32. Jig 10 is mounted to router bit 38 by inserting recessed surface 20 into slot 38a or 38b so that elongate steps 30a, 30b abuttingly engage the carbide strip associated with the preselected slot.

Magnets 24 maintain the position of jig 10 once recessed surface 20 of jig 10 is properly positioned within slot 38a or 38b.

Figure 3:
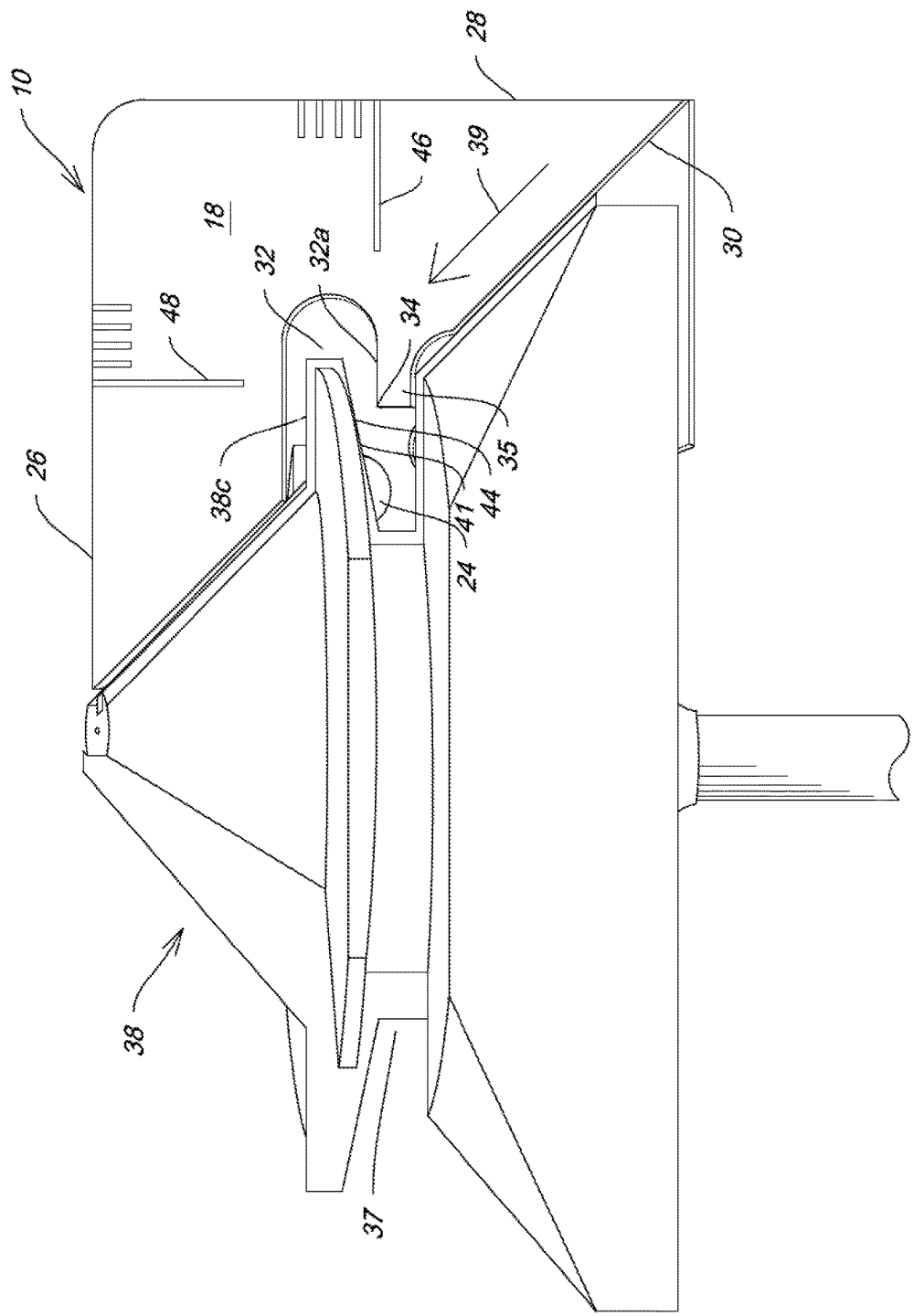
FIG. 3 is essentially a side elevation view depicting the initial position of the novel jig relative to a cutter.
Figure 4:
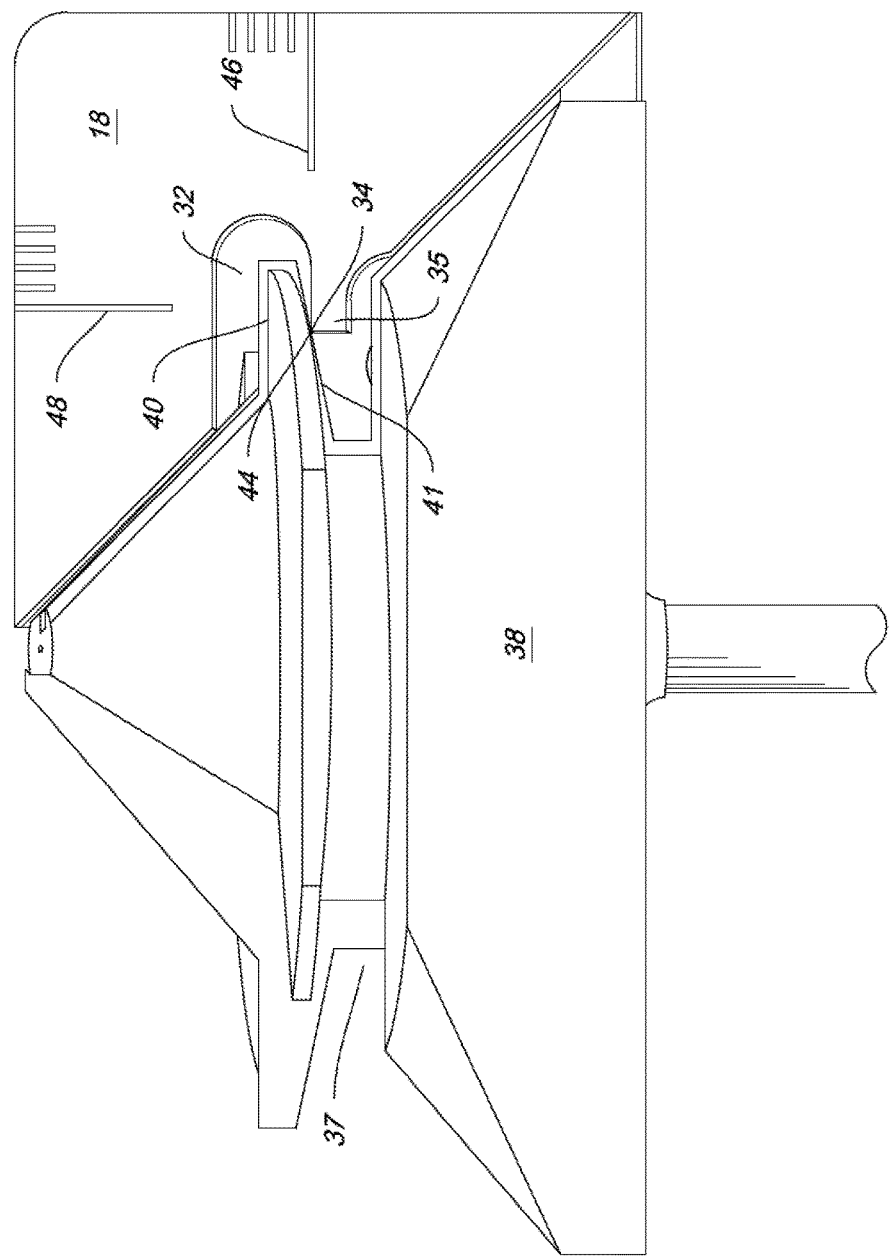
FIG. 4 is a side elevation view depicting the second, final position of the novel jig relative to a cutter.

When jig 10 is properly positioned relative to cutter 38, elongate edge 30 abuttingly engages cutter 38 and geometric center point 34 is in contact with socket top diagonal wall 41 as best understood in connection with FIGS. 3 and 4. That point of contact is the geometric center point of the router bit profile as aforesaid. Jig 10 lays flat against cutter 38 when the boards are marked as disclosed hereinafter.

The exact geometric center of any lock miter cutter profile 44 is where geometric center point 34 meets socket diagonal top wall 41 as best understood in connection with FIG. 4.

Jig 10 is first positioned as depicted in FIG. 3, i.e., the lower edge of jig protuberance 35 is positioned in overlying relation to the flat bottom wall of socket 37 formed in cutter

38. Jig 10 is then slid in the direction of directional arrow 39 until said jig reaches its FIG. 4 position.

As depicted in FIG. 4, secondary recessed area 32 provides clearance for bit protuberance 40 and allows jig 10 to slide from the FIG. 3 position to the FIG. 4 position along the forty five degree (45°) cutting edge of cutter 38, i.e., final positioning is performed by sliding jig 10 as indicated by said directional arrow 39 in FIG. 3 until geometric center point 34 touches the socket diagonal top wall 41 at the geometric center 44 of the router bit profile. Magnets 24 hold jig 10 against carbide strip 38*c*.

Jig 10 can be used with lock miter router bits of different sizes and shapes.

As depicted in FIGS. 3 and 4, main horizontal reference line 46 extends from the lower edge 32*a* of secondary recessed area 32 to second side 28 and main vertical reference line 48 extends to the first side 26. Said lines 46 and 48 are at right angles to each other and both of said lines radiate from geometric center point 34. Lines 46 and 48 are used to perform most lock miter setups. When using vertical reference line 48 to set fence position for any setup, the plane of jig 10 must be perpendicular to the fence. Any minor vertical skew (shear angle) of cutter 38 will have an insignificant impact on the setup.

Figure 5B:
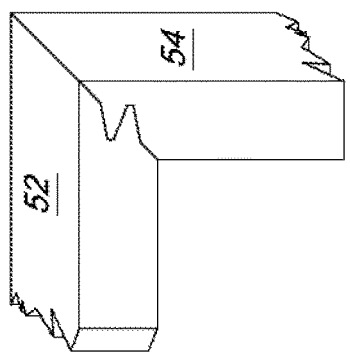
FIG. 5B depicts a lock miter joint in boards having a common thickness.
Figure 5A:
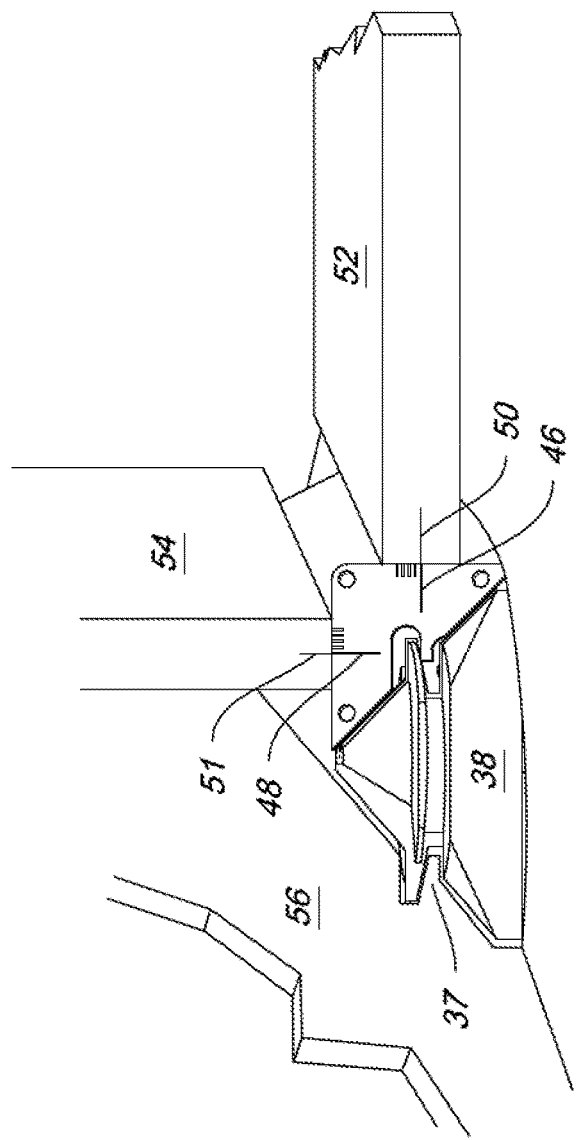
FIG. 5A is a perspective view depicting a setup for a lock miter joint having boards with a common thickness.

FIG. 5A depicts the setup for a standard lock miter joint in boards having a common thickness and the resulting corner is depicted in FIG. 5B.

Centerline 50 is marked on one of the boards using any of a wide variety of devices and simple methods such as a marking gauge, dividers, combination square, center-finder, and the like.

With board 52 in a horizontal position, with its good/outside face facing up, and its edge almost touching jig 10, the height of cutter 38 is adjusted until main horizontal reference line 46 aligns with centerline 50 of board 52. With board 54 temporarily positioned or clamped to fence 56 in the vertical position and the good/outside face pointing away from fence 56, fence 56 is adjusted horizontally until centerline 51 of board 54 aligns with main vertical reference line 48. Jig 10 is then removed and lock miters are cut in all boards. For each joint, one board must be cut in the horizontal position and one cut in the vertical position. Assembly of the joint as depicted in FIG. 5B is accomplished by mating the profiles on each board 52 and 54.

As disclosed hereinafter, the setups for non-standard lock miter joints differs from the set-ups for standard lock miter joints, i.e., slightly different setups and separate cutting operations are required for each board or groups of boards used on opposite sides of the two special lock miter joints disclosed below. The setups for both boards are shown in the same drawing, FIG. 5, for illustration purposes only.

More particularly, the setup for lock miter joints in boards with differing thicknesses is depicted in FIG. 6A and the resulting joint is depicted in FIG. 6B. This demonstrates the versatility of jig 10, i.e., it is not restricted to boards having a common thickness.

Due to the differing thicknesses of the boards, the set up for the first board differs from the setup for the second board.

For the first board setup where there is a group of first boards having a common thickness, one board from each group is marked for setup. All boards are oriented so the good or outside face of the board faces up or away from fence 56. Centerline 50 is marked on the edge of a board 60 from the first group. First board 60 can be cut in either the horizontal or vertical position. It is positioned for cutting in FIG. 6A in the horizontal position. Starting from the outside/good face, and regardless of the thickness of second board 62, the measurement used to mark the center of first board 60 is transferred to second board 62 and line 64 is scribed. Scribed line 64 will not be in the center of second board 62. Second board 62 is then temporarily set aside.

The position of fence 56 and the height of cutter 38 are determined using centerline 50 of the first board 60 only, just as would be done for a standard lock miter as disclosed above in connection with FIG. 5A., i.e., using main reference lines 46, 48. All boards in that group can now be cut in the horizontal position.

Second board 62 is cut in the vertical position because first board 60 was cut in the horizontal position. Fence 56 is re-set so that the off-center mark 64 on second board 62 aligns with main vertical reference line 48. The height of cutter 38 is not readjusted. All remaining boards in the second group are cut in the vertical position. The boards in the resulting lock miter joint will always meet at and look like a normal outside corner. There will be a mismatch on the inside corner 61 as depicted in FIG. 6B due to the difference thicknesses of boards 60 and 62.

Conversely, if first board 60 and all boards in the first group are cut in the vertical position, second board 62 and all boards in that group are cut in the horizontal position. The boards are marked as disclosed above. Fence 56 and cutter 38 height are set using centerline 50 of the marked first board 60 using main reference lines 46, 48. All boards in the first group against fence 56 are then cut in said vertical position. Then, with the marked second board 62 positioned flat on the tabletop with its good side facing up, the bit height is re-set so that off-center mark 64 aligns with main horizontal reference mark 46. The position of fence 56 is not reset. All boards in the second group are then cut.

Figure 7B:
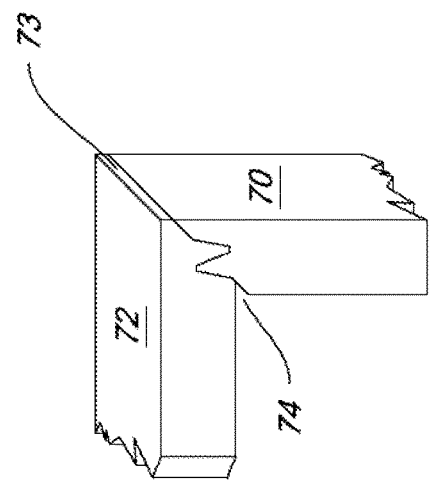
FIG. 7B depicts an offset lock miter joint having an inside corner mismatch.
Figure 7A:
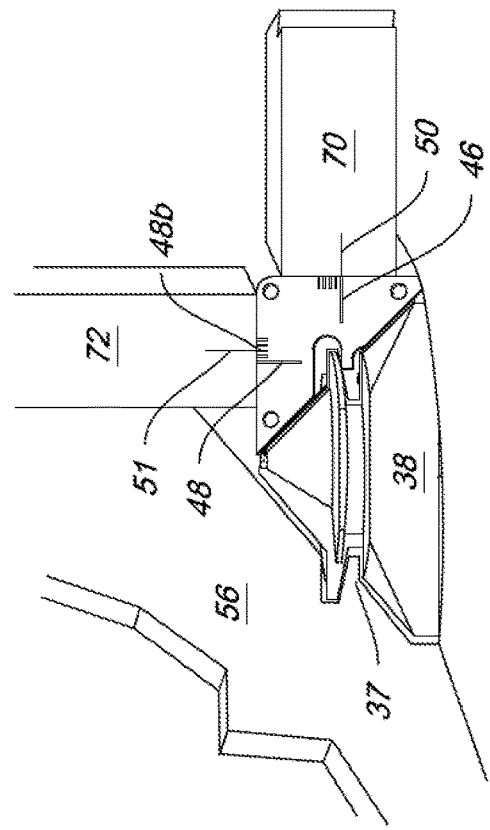
FIG. 7A depicts a setup for an offset lock miter joint.

FIG. 7A depicts the setup for an offset lock miter joint and the resulting joint is depicted in FIG. 7B. Again, the set-up for the first board or the first group of boards differs from the set-up for the second board or second group of boards.

More particularly, centerline 50 is marked on two boards 70, 72 and second board 72 is then temporarily set aside. The height of cutter 38 and the position of fence 56 are set for a standard lock miter joint as depicted in FIG. 5A, using centerline 50 of board 70 and main horizontal 46 and main vertical 48 reference lines. The first group of boards can be cut in either the horizontal or vertical position. In FIG. 7A, board 70, representing the first group of boards, is cut in the horizontal position.

Fence 56 is re-adjusted prior to cutting the boards in the second group after all boards in the first group have been cut. The second group is cut in the vertical position because the first group of boards was cut in the horizontal position. Second board 72 is temporarily clamped to fence 56 and the fence position is adjusted until centerline 51 of vertical board 72 aligns with the appropriate vertical offset reference line which is 48*b* in this example. The height of cutter 38 is not readjusted.

Figure 8:
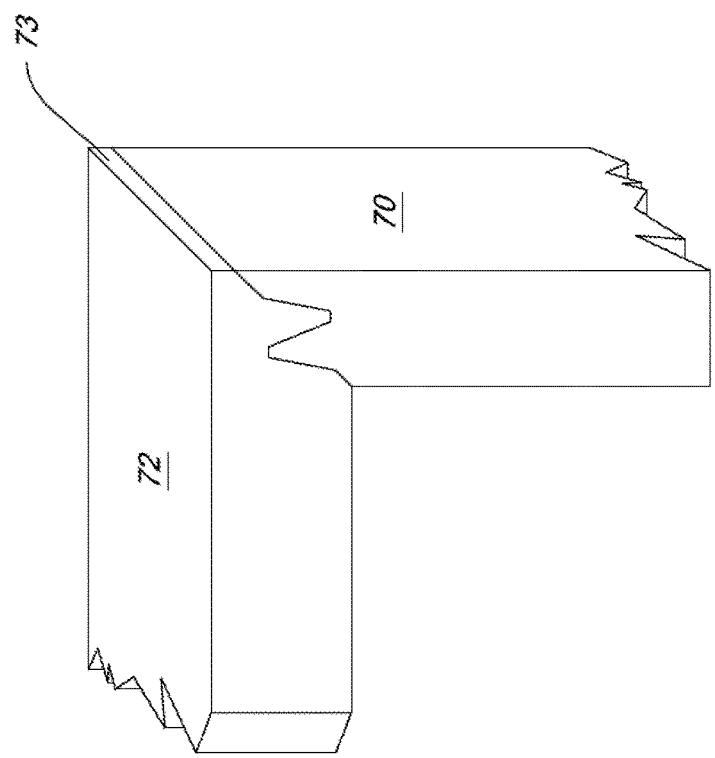
FIG. 8 depicts an offset lock miter joint having no inside corner mismatch.

Offset reference lines 46*a*, 46*b*, etc., are spaced 1/16" apart and yield 1/16" of offset per line. In this example, after all boards are cut and assembled the joint, depicted in FIG. 7B, will have a miter line that is offset by 1/8" as at 73. Mismatch 74 appears at the inside corners unless the thicknesses of the offset board is adjusted to eliminate it as depicted in FIG. 8.

The procedure is reversed to locate the offset on the other side of the joint. The bit height and fence position are set normally and all boards in the first group cut in the vertical position. The bit height is then re-adjusted by aligning centerline 50 of a board in the horizontal position with the desired horizontal offset reference line on the jig. The position of fence 56 is not reset before cutting all boards in the second group.

Novel jig 10 is preferably constructed of milled or cast aluminum to enhance its durability, especially the durability of geometric center point 34. The jig may be made from different materials including but not limited to other metals and plastics and the jig may be subjected to various surface treatments and finishes in all color combinations.

Although magnets are the preferred attachment means, other attachment means include mechanical clips, springs, bands, small suction cups, adhesives, and the like. Magnets could also be eliminated by forming the jig of magnetized ferrous material or by a sandwich of magnetized ferrous metals or other magnetic materials.

Jigs manufactured using a variety of techniques, including but not limited to—stamping, casting, molding, pressing, EDM wire cutting, abrasive waterjet, plasma cutter, and the like, are all within the scope of this invention.

All methods for adding marks to the jig, including but not limited to mechanical and laser engraving, printing, silk screening, for example, are also included within this invention.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A jig that facilitates the formation of a miter joint in a board by a lock miter router bit, comprising:
   a flat base having an elevated area and a recessed area;
   said flat base having four sides, two of said sides being a top edge and a bottom edge that lie in a horizontal plane when the jig is in use, said top edge having a greater extent than said bottom edge, one of said sides being a vertical edge and a fourth side being an oblique edge and extending from said top edge to said bottom edge;
   said elevated area having the form of a right triangle, including one right angle and two forty five degree (45°) angles;
   said recessed area including one angle greater than ninety degrees (90°), one forty five degree (45°) angle, and one angle less than forty five degrees (45°);
   an elongate step formed where said elevated area and said recessed area meet one another, said elongate step being coincident with the hypotenuse of said right triangle;
   said lock miter router bit having a slot formed therein that accommodates said recessed area when said elongate step abuts a surface of said lock miter router bit;
   said elongate step adapted to abut said surface of said lock miter router bit when said router bit is oriented to rotate about a vertical axis of symmetry and said recessed area of said jig is received within said slot and is positioned in abutting relation to said router bit with said flat base oriented in a vertical plane.

2. The jig of claim 1, further comprising:
   said router bit having a profile and said router bit profile having a geometric center point;
   said elongate step being discontinuous a predetermined distance that begins at said geometric center point.

3. The jig of claim 2, further comprising:
   said elongate step having a first part beginning at a first forty five degree (45°) angle of said two forty five degree (45°) angles and extending continuously to said geometric center point of the router bit profile;
   said elongate step having a second part beginning at a second forty five degree (45°) angle of said two forty five degree (45°) angles and extending toward said geometric center point, terminating at a termination point which is a predetermined distance from said geometric center point;
   said recessed area including a main recessed area and a secondary recessed area;
   said secondary recessed area creating said discontinuity in said elongate step.

4. The jig of claim 3, further comprising:
   said first part of said elongate step extending from said first forty five degree (45°) angle and following a first path of travel that extends straight toward said geometric center point and terminating at a first part termination point, a second path of travel extending from said first part termination point toward said router bit parallel to said top and bottom edges of said jig, and a third path of travel parallel to said vertical edge of said jig and terminating at said geometric central point;
   a jig protuberance formed by said second and third paths of travel;
   said jig protuberance including a bottom wall formed by said second path of travel.

5. The jig of claim 4, further comprising:
   said lock miter router bit having a main body of generally frusto-conical shape;
   said router bit including an annular protuberance that extends radially outwardly with respect to said an axis of symmetry of said frusto-conical main body;
   said router bit including an annular socket that extends radially inwardly with respect to axis of symmetry;
   said annular socket adapted to receive said jig protuberance when said jig is disposed in said abutting relation to said router bit.

6. The jig of claim 5, further comprising:
   said secondary recessed area having a first edge following a first path of travel beginning at said geometric center point and extending horizontally toward said vertical wall of said jig to a second point, a second edge following a second path of travel extending from said second point toward said top horizontal wall of said jig in parallel relation to said vertical wall of said jig to a third point, and a third edge following a third path of travel extending horizontally from said third point to said termination point of said second part of said elongate step.

7. The jig of claim 6, further comprising:
   said annular router protuberance having a horizontal top wall, a vertical edge wall, and a diagonal bottom wall;
   said annular router socket having a horizontal bottom wall extending toward said router bit vertical axis of symmetry, a vertical wall extending from the radially innermost end of said socket horizontal bottom wall, and a diagonal top wall extending from a top of said socket vertical wall to a bottom of said vertical edge wall of said router protuberance, said socket diagonal top wall and said diagonal bottom wall of said router protuberance being the same wall.

8. The jig of claim 7, further comprising:

said jig protuberance bottom wall adapted to overlie said horizontal bottom wall of said jig protuberance when said jig abuts said router bit in a first position;

said geometric center point being spaced apart from said socket diagonal top wall when said jig protuberance bottom wall overlies said horizontal bottom wall of said jig protuberance.

9. The jig of claim 8, further comprising:

said geometric center point adapted to abut said socket diagonal top wall when said jig abuts said router bit in a second position that is displaced from said first position;

said geometric center point of the router bit profile being located at the point where the geometric center point meets said socket diagonal top wall.

10. The jig of claim 9, further comprising:

a main horizontal reference line extending from the first edge of the secondary recessed area to said vertical edge of said jig in horizontal alignment with said geometric center point;

a main vertical reference line extending from said third edge of said secondary recessed area to said top edge of said jig in alignment with said geometric center point; and said main horizontal and vertical reference lines disposed at a right angle to one another.

11. The jig of claim 10, further comprising:

at least one slot formed in said cutter to receive the recessed surface of said jig when said jig is engaged to said cutter.

12. The jig of claim 11, further comprising:

a carbide strip secured to a wall of said slot;

said jig being magnetically secured to said carbide strip to facilitate marking said boards with scribe marks.

\* \* \* \* \*